United States Patent
Chun et al.

(10) Patent No.: US 8,184,570 B2
(45) Date of Patent: May 22, 2012

(54) METHOD OF TRANSMITTING DATA IN WIRELESS COMMUNICATION SYSTEM SUPPORTING MULTIMEDIA BROADCAST/MULTICAST SERVICE

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/449,016

(22) PCT Filed: Apr. 30, 2008

(86) PCT No.: PCT/KR2008/002446
§ 371 (c)(1),
(2), (4) Date: Dec. 14, 2009

(87) PCT Pub. No.: WO2008/133474
PCT Pub. Date: Nov. 6, 2008

(65) Prior Publication Data
US 2010/0103814 A1    Apr. 29, 2010

Related U.S. Application Data

(60) Provisional application No. 60/915,042, filed on Apr. 30, 2007, provisional application No. 60/944,785, filed on Jun. 18, 2007.

(30) Foreign Application Priority Data

Apr. 30, 2008   (KR) .................. 10-2008-0040267

(51) Int. Cl.
*H04L 12/24* (2006.01)

(52) U.S. Cl. ........ 370/312; 370/331; 370/338; 370/337; 370/225

(58) Field of Classification Search .................. 370/225, 370/312, 333
See application file for complete search history.

(56) References Cited

U.S. PATENT DOCUMENTS

| 4,205,200 | A | 5/1980 | Parikh et al. |
| 6,157,833 | A | 12/2000 | Lawson-Jenkins et al. |
| 6,324,171 | B1 | 11/2001 | Lee et al. |
| 6,353,628 | B1 | 3/2002 | Wallace et al. |

(Continued)

FOREIGN PATENT DOCUMENTS

AU    2007314859 B2    5/2008

(Continued)

OTHER PUBLICATIONS

PDCP Structure and Traffic Path, R2-073259, 3GPP TSG-RAN WG2 #59, Aug. 20-Aug. 24, 2007, Athens Greece, LG Electronics Inc.

(Continued)

*Primary Examiner* — Ricky Ngo
*Assistant Examiner* — Rasheed Gidado
(74) *Attorney, Agent, or Firm* — McKenna Long & Aldridge LLP (57) ABSTRACT

A method of transmitting data in a wireless communication system supporting a multimedia broadcast/multicast service (MBMS) includes transmitting a data block for the MBMS through a main channel, and transmitting the data block through a sub-channel if an error report for the data block is received. Waste of radio resources is minimized by the use of a main channel while improving quality of the MBMS by restoring data by the use of a sub-channel.

2 Claims, 5 Drawing Sheets

U.S. PATENT DOCUMENTS

| | | |
|---|---|---|
| 6,526,027 B1 | 2/2003 | Yeom |
| 6,567,409 B1 | 5/2003 | Tozaki et al. |
| 6,725,267 B1 * | 4/2004 | Hoang .......................... 709/226 |
| 6,795,419 B2 * | 9/2004 | Parantainen et al. ......... 370/337 |
| 7,197,317 B2 | 3/2007 | Parkvall et al. |
| 7,245,707 B1 | 7/2007 | Chan |
| 7,443,813 B2 | 10/2008 | Hwang et al. |
| 7,551,643 B2 | 6/2009 | Yeo et al. |
| 7,680,058 B2 | 3/2010 | Seurre et al. |
| 7,769,351 B2 | 8/2010 | Kwak et al. |
| 7,801,527 B2 | 9/2010 | Putcha |
| 7,864,731 B2 | 1/2011 | Forsberg |
| 7,899,451 B2 | 3/2011 | Hu et al. |
| 7,912,471 B2 | 3/2011 | Kodikara Patabandi et al. |
| 7,916,697 B2 | 3/2011 | Eklund |
| 7,958,542 B2 | 6/2011 | Herrmann |
| 8,064,676 B2 | 11/2011 | Li et al. |
| 2001/0017850 A1 * | 8/2001 | Kalliokulju et al. ......... 370/331 |
| 2001/0034791 A1 | 10/2001 | Clubb et al. |
| 2001/0044322 A1 | 11/2001 | Raaf |
| 2002/0028690 A1 | 3/2002 | McKenna et al. |
| 2002/0057663 A1 * | 5/2002 | Lim ............................. 370/338 |
| 2002/0059464 A1 | 5/2002 | Hata et al. |
| 2002/0091860 A1 | 7/2002 | Kalliokulju et al. |
| 2003/0007490 A1 | 1/2003 | Yi et al. |
| 2003/0007512 A1 | 1/2003 | Tourunen et al. |
| 2003/0050078 A1 | 3/2003 | Motegi et al. |
| 2003/0123485 A1 | 7/2003 | Yi et al. |
| 2003/0147371 A1 | 8/2003 | Choi et al. |
| 2003/0165122 A1 | 9/2003 | Westphal |
| 2003/0165133 A1 | 9/2003 | Garani |
| 2003/0189922 A1 | 10/2003 | Howe |
| 2003/0207696 A1 * | 11/2003 | Willenegger et al. ......... 455/522 |
| 2004/0014452 A1 | 1/2004 | Lim et al. |
| 2004/0028078 A1 | 2/2004 | Beckmann et al. |
| 2004/0042507 A1 | 3/2004 | Pelletier et al. |
| 2004/0100940 A1 | 5/2004 | Kuure et al. |
| 2004/0117860 A1 * | 6/2004 | Yi et al. ......................... 725/147 |
| 2004/0121771 A1 | 6/2004 | Song et al. |
| 2004/0127265 A1 | 7/2004 | Van Bosch et al. |
| 2004/0148427 A1 | 7/2004 | Nakhjiri et al. |
| 2004/0180675 A1 | 9/2004 | Choi et al. |
| 2004/0185837 A1 | 9/2004 | Kim et al. |
| 2004/0229605 A1 | 11/2004 | Hwang et al. |
| 2004/0242195 A1 | 12/2004 | Chun et al. |
| 2004/0253959 A1 * | 12/2004 | Hwang et al. ................. 455/450 |
| 2005/0009527 A1 | 1/2005 | Sharma |
| 2005/0032555 A1 | 2/2005 | Jami et al. |
| 2005/0041610 A1 * | 2/2005 | Lee et al. ...................... 370/312 |
| 2005/0041681 A1 * | 2/2005 | Lee et al. ...................... 370/437 |
| 2005/0054365 A1 | 3/2005 | Ahn et al. |
| 2005/0063347 A1 | 3/2005 | Sarkkinen et al. |
| 2005/0085254 A1 * | 4/2005 | Chuah et al. .................. 455/522 |
| 2005/0094670 A1 | 5/2005 | Kim |
| 2005/0141462 A1 | 6/2005 | Aerrabotu et al. |
| 2005/0141541 A1 | 6/2005 | Cuny et al. |
| 2005/0151541 A1 | 7/2005 | Brinz et al. |
| 2005/0160184 A1 | 7/2005 | Walsh et al. |
| 2005/0164719 A1 | 7/2005 | Waters |
| 2005/0176430 A1 | 8/2005 | Lee et al. |
| 2005/0176474 A1 | 8/2005 | Lee et al. |
| 2005/0180378 A1 | 8/2005 | Lee et al. |
| 2005/0185620 A1 * | 8/2005 | Lee et al. ...................... 370/331 |
| 2005/0232271 A1 | 10/2005 | Kettunen et al. |
| 2005/0238051 A1 | 10/2005 | Yi et al. |
| 2005/0265294 A1 | 12/2005 | Hu et al. |
| 2005/0286470 A1 | 12/2005 | Asthana et al. |
| 2006/0013165 A1 | 1/2006 | Choi et al. |
| 2006/0034335 A1 | 2/2006 | Karaoguz et al. |
| 2006/0067324 A1 | 3/2006 | Kim et al. |
| 2006/0067364 A1 | 3/2006 | Jung et al. |
| 2006/0087994 A1 * | 4/2006 | Barth et al. ................... 370/310 |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0165045 A1 | 7/2006 | Kim et al. |
| 2006/0203760 A1 | 9/2006 | Fukui et al. |
| 2006/0209870 A1 * | 9/2006 | Lee et al. ...................... 370/432 |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0024972 A1 | 2/2007 | Kuerz et al. |
| 2007/0047452 A1 | 3/2007 | Lohr |
| 2007/0047582 A1 | 3/2007 | Malkamaki |
| 2007/0060139 A1 | 3/2007 | Kim et al. |
| 2007/0064631 A1 | 3/2007 | Tseng et al. |
| 2007/0155389 A1 | 7/2007 | Zhang |
| 2007/0165567 A1 | 7/2007 | Tan et al. |
| 2007/0165635 A1 | 7/2007 | Zhang et al. |
| 2007/0177569 A1 | 8/2007 | Lundby |
| 2007/0178875 A1 | 8/2007 | Rao et al. |
| 2007/0206531 A1 | 9/2007 | Pajukoski et al. |
| 2007/0248075 A1 | 10/2007 | Liu et al. |
| 2007/0258591 A1 | 11/2007 | Terry et al. |
| 2007/0291646 A1 | 12/2007 | Ohishi et al. |
| 2007/0291673 A1 | 12/2007 | Demirhan et al. |
| 2007/0291695 A1 | 12/2007 | Sammour et al. |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0291788 A1 | 12/2007 | Sammour et al. |
| 2007/0293224 A1 | 12/2007 | Wang et al. |
| 2008/0009289 A1 | 1/2008 | Kashima et al. |
| 2008/0043619 A1 | 2/2008 | Sammour et al. |
| 2008/0056198 A1 * | 3/2008 | Charpentier et al. ......... 370/332 |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirskanen et al. |
| 2008/0089292 A1 | 4/2008 | Kitazoe et al. |
| 2008/0095185 A1 | 4/2008 | DiGirolamo et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0188223 A1 | 8/2008 | Vesterinen et al. |
| 2008/0225744 A1 | 9/2008 | DiGirolamo et al. |
| 2008/0225765 A1 | 9/2008 | Marinier et al. |
| 2008/0240439 A1 | 10/2008 | Mukherjee et al. |
| 2008/0267126 A1 | 10/2008 | Vujcic |
| 2008/0268850 A1 | 10/2008 | Narasimha et al. |
| 2008/0273610 A1 | 11/2008 | Malladi et al. |
| 2008/0280567 A1 | 11/2008 | Sharma |
| 2008/0310452 A1 | 12/2008 | Vedantham et al. |
| 2009/0022107 A1 | 1/2009 | Kapoor et al. |
| 2009/0040982 A1 | 2/2009 | Ho et al. |
| 2009/0086659 A1 | 4/2009 | Pani et al. |
| 2009/0086710 A1 | 4/2009 | Ho |
| 2009/0092076 A1 | 4/2009 | Zheng et al. |
| 2009/0109912 A1 | 4/2009 | DiGirolamo et al. |
| 2009/0124259 A1 | 5/2009 | Attar et al. |
| 2009/0143074 A1 | 6/2009 | Pelletier et al. |
| 2009/0163199 A1 | 6/2009 | Kazmi et al. |
| 2009/0181710 A1 | 7/2009 | Pani et al. |
| 2009/0207771 A1 | 8/2009 | Lindskog |
| 2009/0239538 A1 | 9/2009 | Motegi et al. |
| 2009/0318170 A1 | 12/2009 | Lee et al. |
| 2010/0027413 A1 | 2/2010 | Park et al. |
| 2010/0046384 A1 | 2/2010 | Lee et al. |
| 2010/0061330 A1 | 3/2010 | Hanov |
| 2010/0128669 A1 | 5/2010 | Chun et al. |
| 2010/0165901 A1 | 7/2010 | Kim |
| 2010/0227614 A1 | 9/2010 | Chun et al. |
| 2010/0238799 A1 | 9/2010 | Sebire |
| 2010/0238903 A1 | 9/2010 | Kitazoe |
| 2010/0272004 A1 | 10/2010 | Maeda et al. |
| 2010/0309877 A1 | 12/2010 | Damnjanovic et al. |
| 2011/0039536 A1 | 2/2011 | Lee et al. |
| 2011/0090836 A1 | 4/2011 | Mochizuki et al. |
| 2011/0116436 A1 | 5/2011 | Bachu et al. |
| 2012/0002589 A1 | 1/2012 | Saifullah et al. |

FOREIGN PATENT DOCUMENTS

| | | |
|---|---|---|
| CN | 1719932 | 1/2006 |
| EP | 1148753 A2 | 10/2001 |
| EP | 1 168 877 | 1/2002 |

| | | |
|---|---|---|
| EP | 1 209 938 | 5/2002 |
| EP | 1304898 A1 | 4/2003 |
| EP | 1 315 356 | 5/2003 |
| EP | 1315356 A2 | 5/2003 |
| EP | 1 318 632 | 6/2003 |
| EP | 1 337 124 A2 | 8/2003 |
| EP | 1 372 310 | 12/2003 |
| EP | 1372310 A1 | 12/2003 |
| EP | 1420551 A2 | 5/2004 |
| EP | 1501328 A2 | 1/2005 |
| EP | 1 511 245 | 3/2005 |
| EP | 1 720 322 | 11/2006 |
| EP | 1 720 373 | 11/2006 |
| EP | 1932380 | 6/2008 |
| EP | EP 2087653 | 8/2009 |
| JP | 06-006294 | 1/1994 |
| JP | 2002-539686 | 11/2002 |
| JP | 2003-504935 | 2/2003 |
| JP | 2003-087180 | 3/2003 |
| JP | JP 2003-196775 | 7/2003 |
| JP | 2003-235064 | 8/2003 |
| JP | JP 2005-057787 | 3/2005 |
| JP | 2005-354488 | 12/2005 |
| JP | 2006-505979 | 2/2006 |
| JP | 2006-067115 | 3/2006 |
| JP | 2006-515737 | 6/2006 |
| JP | JP 2006-528456 | 12/2006 |
| JP | 2007-165635 | 6/2007 |
| JP | 2008-535370 | 8/2008 |
| JP | 2008-539678 | 11/2008 |
| JP | 2009-540721 | 11/2009 |
| JP | 2009-542100 | 11/2009 |
| KR | 10-2001-0105240 | 11/2001 |
| KR | 10-2004-0039944 | 5/2004 |
| KR | 10-2004-0048675 | 6/2004 |
| KR | 10-2005-0008440 | 1/2005 |
| KR | 10-2005-0027972 | 3/2005 |
| KR | 10-2005-0096763 | 10/2005 |
| KR | 10-2007-0038425 A | 4/2007 |
| RU | 2249917 | 4/2005 |
| WO | WO 00/074416 | 12/2000 |
| WO | WO 2004/043094 A2 | 5/2004 |
| WO | WO 2004/102833 A1 | 11/2004 |
| WO | WO 2005/015776 | 2/2005 |
| WO | WO-2005-018098 A2 | 2/2005 |
| WO | WO 2005/048613 A1 | 5/2005 |
| WO | WO-2005-067194 A1 | 7/2005 |
| WO | WO 2006/049441 | 5/2006 |
| WO | WO 2006/075820 | 7/2006 |
| WO | WO 2006/104344 | 10/2006 |
| WO | WO 2006/109851 | 10/2006 |
| WO | WO 2006/116620 | 11/2006 |
| WO | WO 2007/025138 | 3/2007 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | WO 2007/133034 A2 | 11/2007 |
| WO | WO 2007/144757 | 12/2007 |
| WO | WO 2007/149509 | 12/2007 |
| WO | WO 2008/042889 | 4/2008 |
| WO | WO 2008/054103 A1 | 5/2008 |
| WO | WO 2008/111684 | 9/2008 |
| WO | WO 2009/084998 A1 | 7/2009 |

OTHER PUBLICATIONS

PDCP Retransmissions, R2-073041, 3GPP TSG-RAN WG2 #59, Aug. 19-Aug. 24, 2007, Athens Greece, LG Electronics Inc.
Contents of PDCP Status Report, XP-002580785, 3GPP TSG-RAN WG2 #59, Oct. 8-Oct. 12, 2007, Shanghai, China, LG Electronics Inc.
Nokia, "Requirements for redirection in E-UTRAN", 3GPP TSG-RAN WG2 Meeting #56-bis, R2-070107, Jan. 2007.
NTT DoCoMo, Inc.; "MAC PDU structure for LTE", 3GPP TSG RAN WG2 #56bis, R2-070280, Jan. 2007, XP050133369.
Catt et al.; "Enhancement to Buffer Status Reporting", 3GPP TSG-RAN WG2#57bis , R2-071345, Mar. 2007, XP050134291.
LG Electronics; "Relative Buffer Status Reporting", 3GPP TSG-RAN WG2 Meeting #46bis, R2-050852, Apr. 2005.
IPWireless; "Layer 2 functions for LTE", 3GPP TSG RAN WG2 #48bis, R2-052377, Oct. 2005.
Samsung; "Re-use of PDCP SN at ARQ level ?", 3GPP TSG-RAN2 Meeting #53bis, R2-061829, Jun. 2006.
Panasonic; "MAC PDU format for LTE", 3GPP TSG RAN WG2Meeting #56bis R2-070096, Jan. 2007.
Samsung; "Selective forwarding/retransmission during HO", 3GPP TSG-RAN2 Meeting #56bis, R2-070130, Jan. 2007.
"$3^{rd}$ Generation Partnership Project; Technical Specification Group Radio Access Network; Evolved Universal Terrestrial Radio Access (E-UTRA) Medium Access Control (MAC) protocol specification (Release 8)" 3GPP Standard; 3GPP TS 36.321, $3^{rd}$ Generation Partnership Project (3GPP), Mobile Competence Centre; No. V8.1.0, Mar. 1, 2008, p. 1-28, XP050377617.
3GPP Draft; R2-081607 UL Timing Control Related to Contention RESOLUTION_R4, $3^{rd}$ Generation Parnership Project (3GPP), Mobile Competence Centre; vol. RAN WG2, no. Shenzhen, China; 20080325, Mar. 25, 2008, XP050139334.
"Grandularity Consideration for Variable RLC PDU Sizes" Asustek; 3GPP TSG-Ran WG2 Meeting #56bis Sorrento, Italy, Jan. 15-19, 2007.
$3^{rd}$ Generation Partnership Project; Technical Specification Group Radio Access Network; Medium Access Control (MAC) Protocol Specification; 3GPP TS 25.321; V7.4.0 (Mar. 2007).
$3^{rd}$ Generation Partnership Project; Technical Specification Group Radio Access Network; Packet Data Convergence Protocol (PDCP) Specification (Release 7) 3GPP TS 25.323 V7.4.0 (Mar. 2007).
TSG-Tan Working Group 2 (Radio Layer 2 and Radio Layer 3); Sophia Antipolis; Nov. 29-Dec. 3, 1999.
Youjun Gao et al.: "Research on the access network and MAC technique for beyond 3G systems" IEEE Wireless Communications, IEEE Service Center, Piscataway, NJ, US, vol. 14, No. 2, Apr. 1, 2007, pp. 57-61, XP011184637 ISSN: 15361284.
Nokia Corporation, Nokia Seimens Networks: "MAC header format, 820073891" 3GPP TSG-RAN WG2 meeting 59bis. Oct. 2007, Shanghai China, XP-002602993.
LG Electronics Inc: "Support for VoIP over MAC-hs/ehs" 3GPP Draft; R2-071542 Support for VoIP Over MAC-hs, $3^{rd}$ Generation Partnership Project (3GPP), Mobile Competence Centre; 650, Route Des Luciloes, F-06921 Sophia-Antipolis Cedex; France, vol. RAN WG2, no. St. Julian; Apr. 2007, XP050134474.
Alcatel-Lucent: "Downlink Control Signaling and Multiplexing for VOIP, R1-071721", $3^{rd}$ Generation Partnership Project (3GPP); Technical Specification Group (TSG) Radio Access Network (RAN); Working Group 1 (WG1) No. 48bis, Mar. 2007, XP002460800.
Ericsson: "MAC header for Improved L2 support for high data rates", 3GPP TSG-RAN WG2 #57, St. Louis, Missouri, Feb. 12-16, 2007, R2-0708010, XP-50133836.
Ericsson: "Initial Random Access Procedure for E-UTRAN", 3GPP TSG-RAN WG2 #55, Seoul, Korea, Oct. 9-13, 2006, R2-062853.
Samsung: "LTE Random access procedure", 3GPP TSG RAN #54, Tallinn, Estonia, Aug. 28-Sep. 2, 2006, R2-062258.
Siemens: "Initial Access Procedure", 3GPP TSG-RAN WG2 LTE Adhoc meeting, Cannes, France, Jun. 27-30, 2006, R2-061931.
IPWireless: "Contention Resolution in Non-Synchronous RACH Access", RAN2 #54, Tallinn, Estonia, Aug. 28-Sep. 1, 2006, R2-062269.
NTT DoCoMo, Inc. "Views on DRX/DTX control in Lte", 3GPP TSG RAN WG2 #56, Nov. 6-10, 2006, Riga, Latvia, R2-063397, XP050132870.
Nokia. "Active mode DRX details", 3GPP TSG RAN WGx Meeting #55, Oct. 9-13, 2006, Seoul, Korea, R2-062753, XP002437990.
Email Rapporteur (Nokia), "DRX in E-UTRAN", 3GPP TSG RAN WG2 Meeting #57, Feb. 12-16, 2007, St. Louis, Missouri, R2-070463, XP050133530.
LG Electronics: "U-plane ciphering at MAC / Physical Layer", 3GPP TSG RAN WG2 #57bis, St. Julian's, Malta, Mar. 26-30, 2007, R2-071550.

LG Electronics: "Discussion on Message 4 in Random Access", 3GPP TSG RAN WG2 #58, Kobe, Japan, May 7-11, 2007, R2-071923.

LG Electronics: "Discussion on Message 4 in Random Access", 3GPP TSG RAN WG2 #57, St. Louis, Missour, Feb. 15-19, 2007, R2-070519.

NTT DoCoMo, Inc: "E-mail discussion on U-plane ciphering location for LTE", 3GPP TSG RAN WG2 #57bis, St. Julian's, Malta, Mar. 26-30, 2007, R2-071293.

LG Electronics: "Discussion on Message 4 in Random Access", 3GPP TSG RAN WG2 #57bis, St. Julian's, Malta, Mar. 26-30, 2007, R2-071456.

Catt, "Non-synchronized access and C-RNTI allocation", 3GPP WSG-RAN WG2, #55, Seoul, Korea, Oct. 9-13, 2006, R2-062933.

Ericsson, "Initial Random Access Procedure for E-UTRAN", 3GPP TSG RAN WG2, #55, Seoul, Korea, Oct. 9-13, 2006, R2-062853.

LG Electronics, "Drx Scheme", 3GPP TSG-RAN WG2 #56bis, Jan. 15-19, 2007, Sorrento, Italy, R2-070265.

Nokia, "Discontinuous reception in CELL_FACH", 3GPP TSG-RAN WG2 Meeting #58, St. Julian's, Malta, Mar. 26-30, 2007, R2-071403.

Siemens, "Initial Access Procedure", 3GPP TSG RAN WG2 LTE Ad hoc Meeting, Cannes, France, Jun. 27-30, 2006, R2-061931.

Samsung, "LTE Random access procedure", 3GPP TSF RAN2#54, Tallinn, Estonia, Aug. 28-Sep. 2, 2006, R2-062258.

* cited by examiner

METHOD OF TRANSMITTING DATA IN WIRELESS COMMUNICATION SYSTEM SUPPORTING MULTIMEDIA BROADCAST/MULTICAST SERVICE

This application is a 371 national stage entry of International Application No. PCT/KR2008/002446, filed Apr. 30, 2008, and claims priority to U.S. Provisional Patent Application No. 60/915,042, filed Apr. 30, 2007, U.S. Provisional Patent Application No. 60/944,785, filed Jun. 18, 2007; and Korean Patent Application No. 10-2008-0040267, filed in the Republic of Korea on Apr. 30, 2008, the contents of each of the above-identified applications is incorporated by reference herein in their entireties.

TECHNICAL FIELD

The present invention relates to wireless communications, and more particularly, to a method of providing a multimedia broadcast/multicast service (MBMS) in a wireless communication system.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment (UE), and the like are defined as requirements.

Similarly to a conventional cell broadcast service (CBS), a multimedia broadcast/multicast service (MBMS) simultaneously transmits a data packet in the same manner to a plurality of users. The CBS is a low-speed message-based service whereas the MBMS aims at high-speed multimedia data transmission. The CBS is not based on an Internet protocol (IP) whereas the MBMS is based on IP multicast. If users satisfying a specific level exist in the same cell, necessary resources (or channels) transmitted to each user are shared so that a plurality of users can receive the same multimedia data. Therefore, the MBMS has an advantage in that radio resources can be more efficiently used and a multimedia service can be used at a low price from the perspective of the users.

The MBMS uses a common channel so that a plurality of user equipments (UEs) effectively receive one service. That is, regarding data of one service, only one common channel is allocated instead of allocating a predetermined number of dedicated channels corresponding to the plurality of UEs which intend to receive the service in one cell. Since the plurality of UEs simultaneously receive the common channel, efficiency of radio resources increases.

For the effective use of the radio resources, the MBMS uses a method in which one common channel is received by a plurality of UEs. That is, in every transmission period, when transmission of MBMS data is instructed, the plurality of UEs attempt to receive the MBMS data through the common channel.

However, the plurality of UEs may belong to different radio channel environments. A base station (BS) neither allocates the common channel nor controls transmission characteristics according to a location of each UE or a radio channel environment. That is, even if the UE fails to receive the MBMS data or if the UE is located in a poor radio channel environment, the BS cannot perform a special operation for the UE. Therefore, the UE experiences deterioration in service quality.

DISCLOSURE OF INVENTION

Technical Problem

The present invention provides a data transmission method for providing a multimedia broadcast/multicast service (MBMS) with improved quality.

Technical Solution

According to an aspect of the present invention, a method of transmitting data in a wireless communication system supporting a multimedia broadcast/multicast service (MBMS) includes transmitting a data block for the MBMS through a main channel and transmitting the data block through a sub-channel if an error report for the data block is received.

According to an aspect of the present invention, a method of receiving data in a wireless communication system supporting an MBMS includes receiving a data block for the MBMS through a main channel, transmitting an error report if an error is detected from the data block and receiving the data block through a sub-channel.

Advantageous Effects

Waste of radio resources is minimized by the use of a common channel while improving quality of a multimedia broadcast/multicast service (MBMS) by restoring data by the use of a dedicated channel.

MODE FOR THE INVENTION

Figure 1:
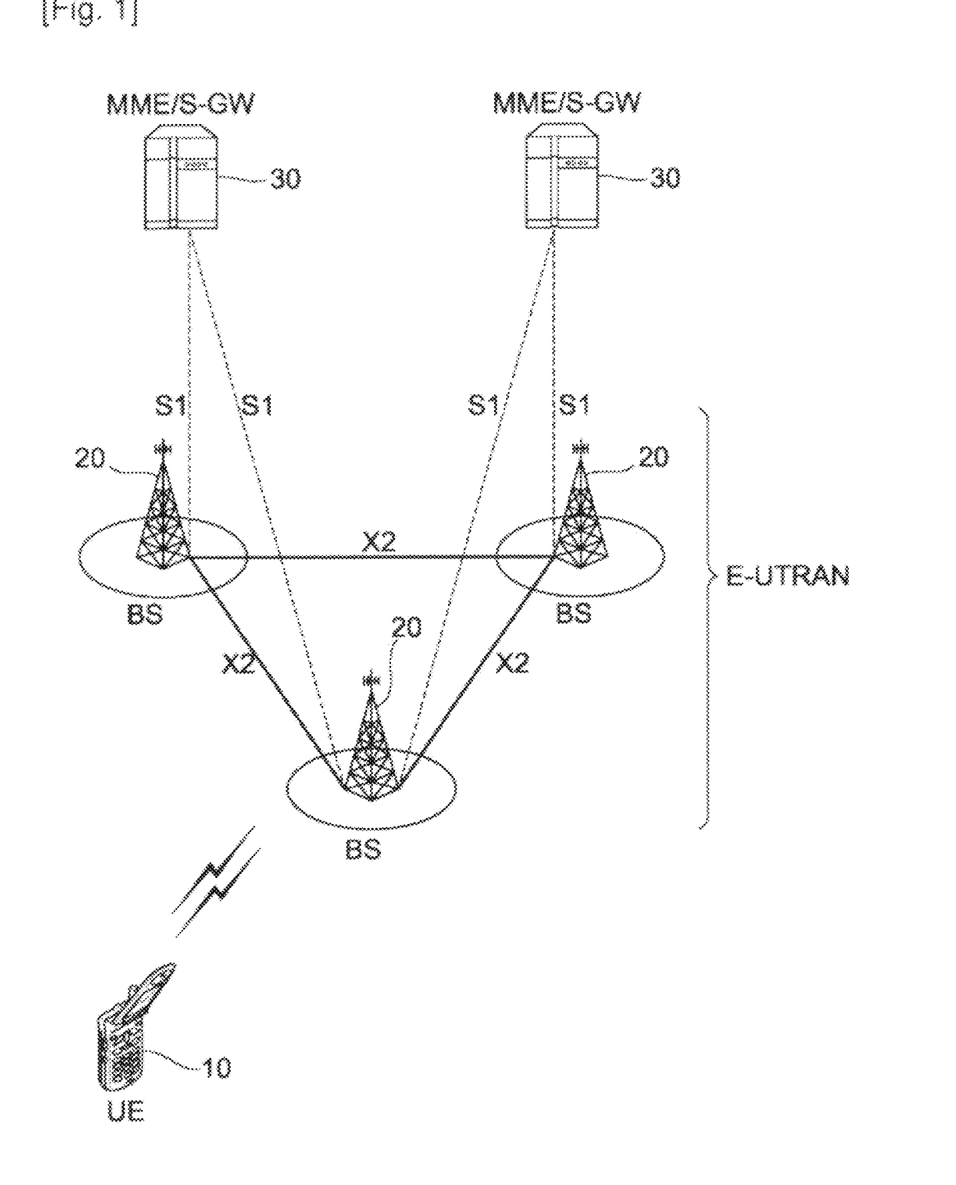
FIG. 1 is a block diagram showing a wireless communication system.

FIG. 1 is a block diagram showing a wireless communication system. This may be a network structure of an E-UMTS (Evolved-Universal Mobile telecommunications System). The E-UMTS system may be referred to as an LTE (Long-term Evolution) system. The wireless communication system can widely be deployed to provide a variety of communication services, such as voices, packet data, and the like.

Referring to FIG. 1, an E-UTRAN (Evolved-UMTS Terrestrial Radio Access

Network) includes at least one base station (BS) 20. A user equipment (UE) 10 can be fixed or mobile and can be referred to as another terminology, such as a MS (Mobile Station), a UT (User Terminal), a SS (Subscriber Station), a wireless device, or the like. The BS 20 generally is a fixed station that communicates with the user equipment 10 and can be referred to as another terminology, such as an e-NB (evolved-NodeB), a BTS (Base Transceiver System), an access point, or the like. There are one or more cells within the coverage of the BS 20. Interfaces for transmitting user traffic or control traffic can be used between BSs 20. Hereinafter, downlink means communication from the BS 20 to the UE 10, and uplink means a communication from the UE 10 to the BS 20.

The BSs 20 are interconnected with each other by means of an X2 interface. The BSs 20 are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MME/S-GW 30 and the BS 20.

Figure 2:
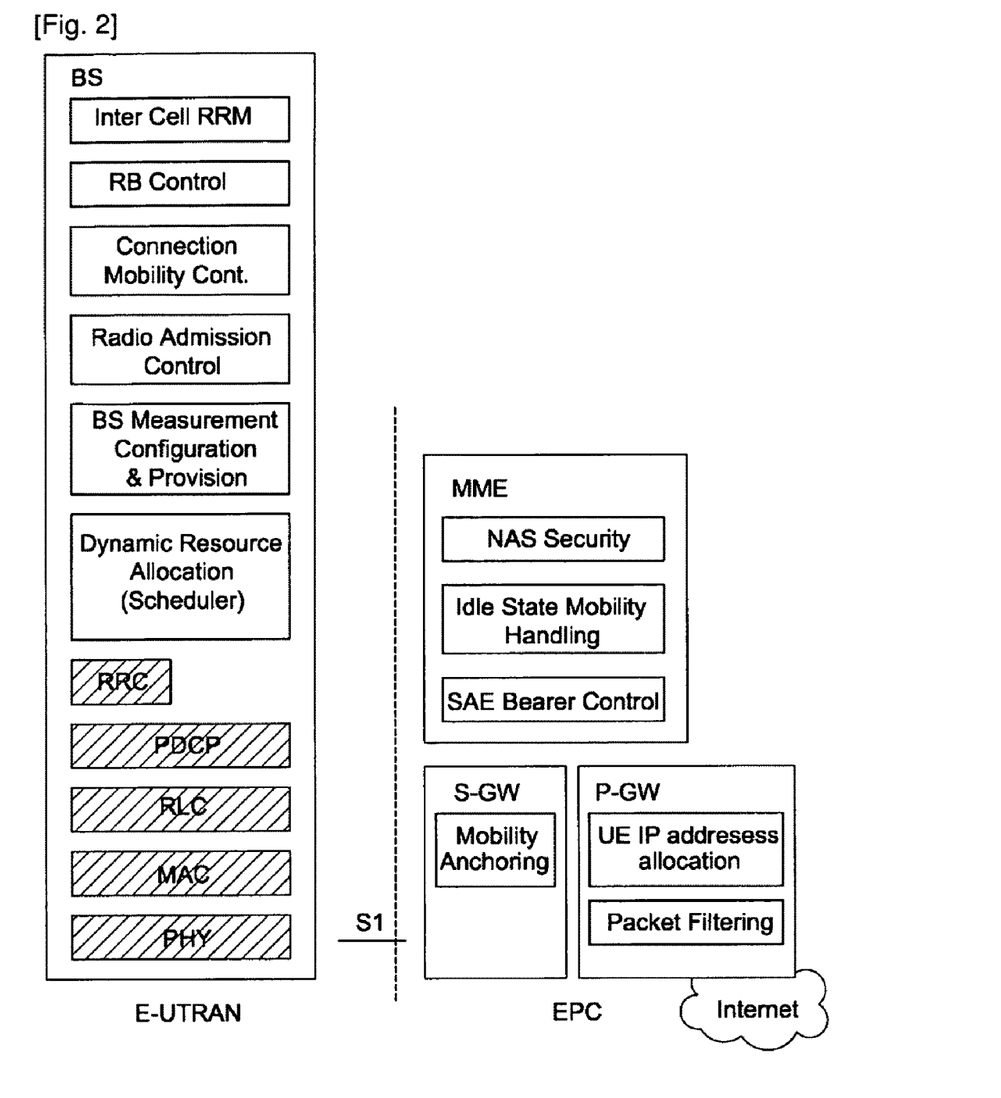
FIG. 2 is a block diagram showing functional split between an evolved-universal mobile telecommunications system terrestrial radio access network (E-UTRAN) and an evolved packet core (EPC).

FIG. 2 is a block diagram showing functional split between the E-UTRAN and the EPC. Slashed boxes depict radio protocol layers and white boxes depict the functional entities of the control plane.

Referring to FIG. 2, a BS hosts the following functions. (1) Functions for Radio Resource Management such as Radio Bearer Control, Radio Admission Control, Connection Mobility Control, Dynamic allocation of resources to UEs in both uplink and downlink (scheduling), (2) IP (Internet Protocol) header compression and encryption of user data stream, (3) Routing of User Plane data towards S-GW, (4) Scheduling and transmission of paging messages, (5) Scheduling and transmission of broadcast information, and (6) Measurement and measurement reporting configuration for mobility and scheduling.

The MME hosts the following functions. (1) NAS (Non-Access Stratum) signaling, (2) NAS signaling security, (3) Idle mode UE Reachability, (4) Tracking Area list management, (5) Roaming, (6) Authentication.

The S-GW hosts the following functions. (1) Mobility anchoring, (2) lawful interception. The PDN gateway (P-GW) hosts the following functions. (1) UE IP (interne protocol) allocation, (2) packet filtering.

Figure 3:
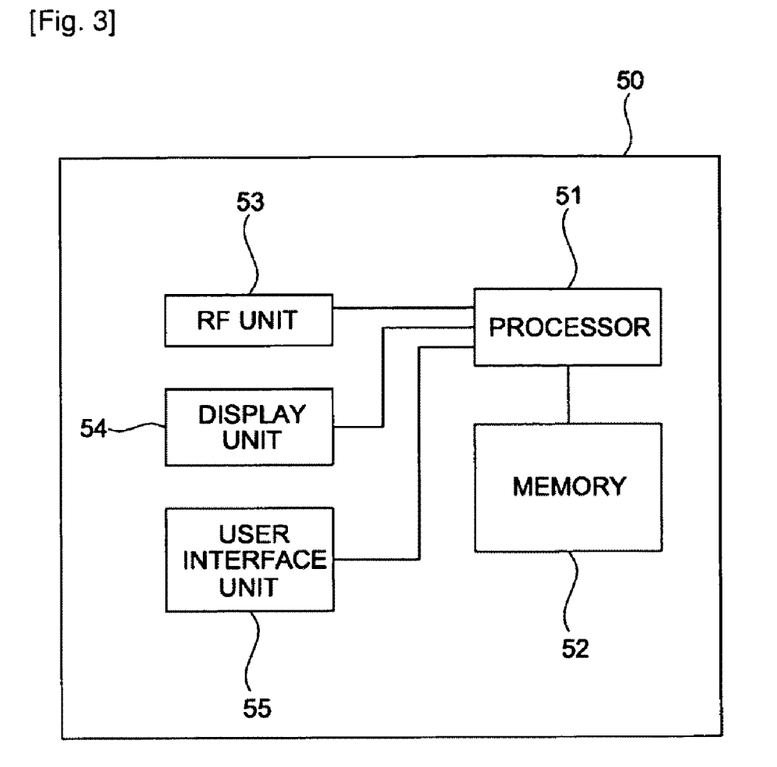
FIG. 3 is a block diagram showing constitutional elements of a user equipment (UE).

FIG. 3 is a block diagram showing constitutional elements of a UE. A UE 50 includes a processor 51, a memory 52, a RF unit 53, a display unit 54 and a user interface unit 55. Layers of the radio interface protocol are implemented in the processor 51. The processor 51 provides a control plane and a user plane. The function of each layer can be implemented in the processor 51. The memory 52 is coupled to the processor 51 and stores an operating system, applications, and general files. The display unit 54 displays a variety of information of the UE and may use a well-known element, such as an LCD (Liquid Crystal Display) or OLED (Organic Light Emitting Diode. The user interface unit 55 can be configured with a combination of well-known user interfaces such as a keypad or touch screen. The RF unit 53 is coupled to the processor 51 and transmits and/or receives radio signals.

Layers of the radio interface protocol between the user equipment and the base station can be classified into L1 layer (a first layer), L2 layer (a second layer), and L3 layer (a third layer) based on the lower three layers of the Open System Inter-connection (OSI) model that is well-known in the related art. A physical (PHY) layer belonging to the first layer provides information transfer services on a physical channel. A radio resource control (RRC) layer belonging to the third layer serves to control radio resources between the user equipment and the network. The user equipment and the network exchange RRC messages via the RRC layer.

Figure 4:
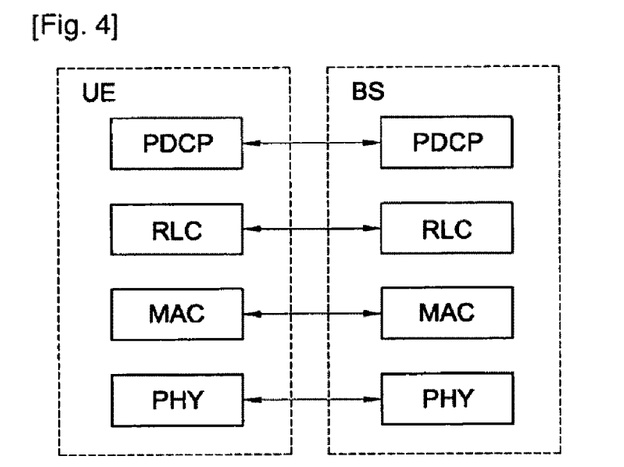
FIG. 4 is a block diagram showing radio protocol architecture for a user plane.
Figure 5:
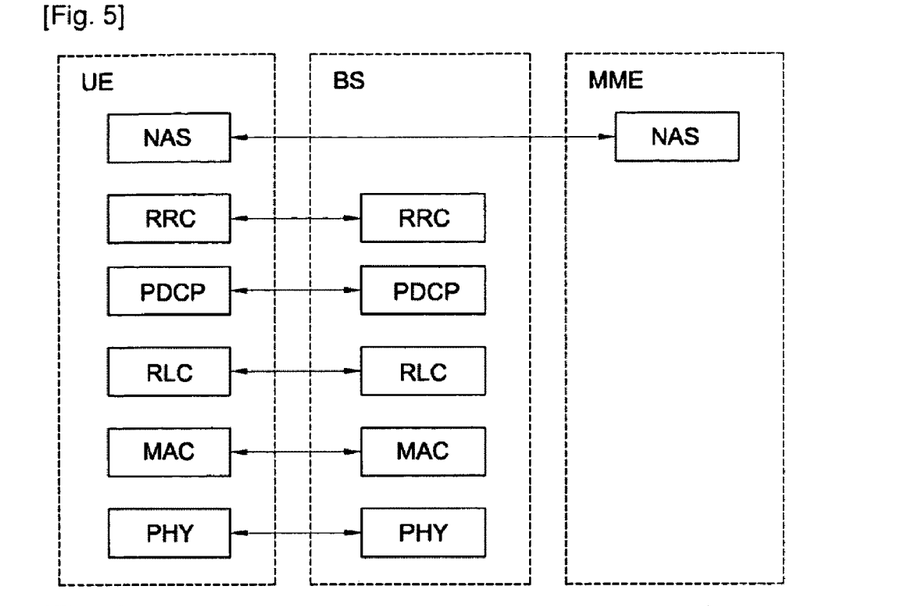
FIG. 5 is a block diagram showing radio protocol architecture for a control plane.

FIG. 4 is a block diagram showing radio protocol architecture for a user plane. FIG. 5 is a block diagram showing radio protocol architecture for a control plane. They illustrate the architecture of a radio interface protocol between the UE and the E-UTRAN. The data plane is a protocol stack for user data transmission and the control plane is a protocol stack for control signal transmission.

Referring to FIGS. 4 and 5, a physical (PHY) layer belonging to the first layer offers information transfer services to upper layers on a physical channel. The PHY layer is coupled with a MAC (Medium Access Control) layer, i.e., an upper layer of the PHY layer, through a transport channel. Data is transferred between the MAC layer and the PHY layer through the transport channel. Between different physical layers, i.e., the physical layer of a transmitter and the physical layer of a receiver, data are transferred through the physical channel.

The MAC layer in the second layer provides services to a RLC (Radio Link Control) layer, i.e., an upper layer of the MAC layer, through a logical channel. The RLC layer in the second layer supports reliable data transfer. There are three operating modes in the RLC layer, such as TM (Transparent Mode), UM (Unacknowledged Mode) and AM (Acknowledged Mode) according to a data transfer method. The AM RLC provides bidirectional data transmission services and supports re-transmission when the transfer of a RLC PDU (Protocol Data Unit) is failed.

A PDCP (Packet Data Convergence Protocol) belonging to the second layer performs a header compression function. The PDCP layer reduces the header size of the Internet Protocol (IP) packet so as to efficiently transmit the IP packet.

A RRC (Radio Resource Control) layer belonging to the third layer is defined only in the control plane. The RRC layer serves to control the logical channel, the transport channel, and the physical channel in association with configuration, reconfiguration and release of radio bearers (RBs). A RB means a service provided by the second layer for data transmission between the user equipment and the network. When a RRC connection is established between the RRC layer of the user equipment and the RRC layer of the network, it is called that the user equipment is in the RRC connected mode. When a RRC connection is not established yet, it is called that the user equipment is in the RRC idle mode.

A NAS (Non-Access Stratum) layer belonging to the upper layer of the RRC layer serves to perform session management and mobility management.

Figure 6:
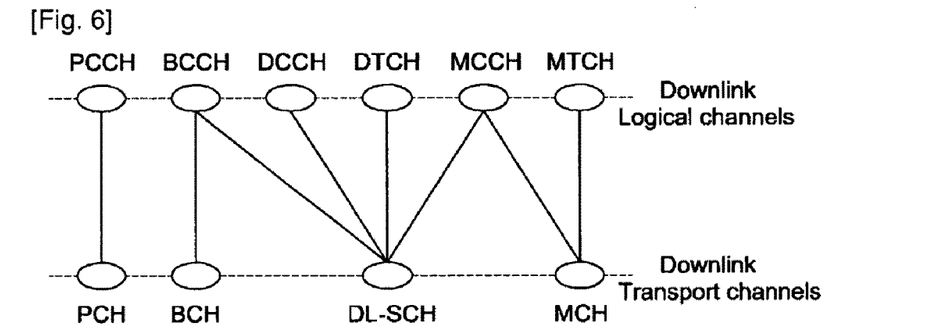
FIG. 6 shows mapping between downlink logical channels and downlink transport channels.

FIG. 6 shows mapping between downlink logical channels and downlink transport channels. This is disclosed in the section 6.1.3.2 of 3GPP TS 36.300 V8.3.0 (2007-12) Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Referring to FIG. 6, a paging control channel (PCCH) can be mapped to a paging channel (PCH). A broadcast control channel (BCCH) can be mapped to a broadcast channel (BCD) or a downlink shared channel (DL-SCH). A common control channel (CCCH), a dedicated control channel (DCCH), a dedicated traffic channel (DTCH), a multicast control channel (MCCH) and a multicast traffic channel (MTCH) can be mapped to the DL-SCH. The MCCH and MTCH can also be mapped to a multicast channel (MCH).

Each logical channel type is defined by what type of information is transferred. A classification of logical channels is into two groups: control channels and traffic channels.

Control channels are used for transfer of control plane information. The BCCH is a downlink control channel for broadcasting system control information. The PCCH is a downlink channel that transfers paging information and is used when the network does not know the location cell of the UE. The CCCH is a channel for transmitting control information between UEs and network and is used for UEs having no RRC connection with the network. The MCCH is a point-to-multipoint downlink channel used for transmitting multimedia broadcast multicast service (MBMS) control information from the network to the UE for one or several MTCHs and is only used by UEs that receive MBMS. The DCCH is a point-to-point bi-directional channel that transmits dedicated control information between a UE and the network and is used by UEs having an RRC connection.

Traffic channels are used for the transfer of user plane information. The DTCH is a point-to-point channel dedicated to one UE, for the transfer of user information. The DTCH can exist in both uplink and downlink. The MTCH is a point-to-multipoint downlink channel for transmitting traffic data from the network to the UE and is only used by UEs that receive MBMS.

The transport channels are classified by how and with what characteristics data are transferred over the radio interface. The BCH is broadcasted in the entire coverage area of the cell and has fixed, pre-defined transport format. The DL-SCH is characterized by support for hybrid automatic repeat request (HARQ), support for dynamic link adaptation by varying the modulation, coding and transmit power, possibility to be broadcast in the entire cell, possibility to use beamforming, support for both dynamic and semi-static resource allocation, support for UE discontinuous reception (DRX) to enable UE power saving and support for MBMS transmission. The PCH is characterized by support for UE discontinuous reception (DRX) to enable UE power saving and requirement to be broadcast in the entire coverage area of the cell. The MCH is characterized by requirement to be broadcast in the entire coverage area of the cell, support for MBMS Single Frequency Network (MBSFN) combining of MBMS transmission on multiple cells.

Figure 7:
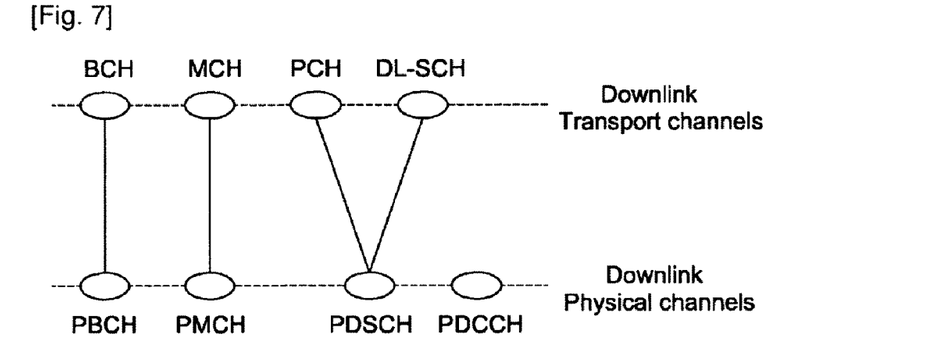
FIG. 7 shows mapping between downlink transport channels and downlink physical channels.

FIG. 7 shows mapping between downlink transport channels and downlink physical channels. This is disclosed in the section 5.3.1 of the 3GPP TS 36.300 V8.3.0 (2007-12).

Referring to FIG. 7, a BCH can be mapped to a physical broadcast channel (PBCH). A MCH can be mapped to a physical multicast channel (PMCH). A PCH and a DL-SCH can be mapped to a physical downlink shared channel (PDSCH). The PBCH carries the BCH transport block. The PMCH carries the MCH. The PDSCH carries the DL-SCH and PCH.

There are several downlink physical control channels used in the physical layer. A physical downlink control channel (PDCCH) informs the UE about the resource allocation of PCH and DL-SCH, and HARQ information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions.

A multimedia broadcast multicast service (MBMS) uses two logical channels, that is, an MCCH (i.e., a control channel) and an MTCH (i.e., a traffic channel). User data (e.g., actual voice or video) is transmitted on the MTCH. Configuration information for receiving the MTCH is transmitted on the MCCH. The MTCH and the MCCH are point-to-multipoint downlink channels for a plurality of UEs and can be regarded as common channels. In the MBMS, an amount of allocated radio resources does not coincide with the number of UEs receiving services. Instead, only radio resources for the common channels are allocated and the common channels are simultaneously received by the plurality of UEs, thereby improving efficiency of the radio resources.

The plurality of UEs operate under a variety of radio channels. A method capable of recovering MBMS data which is not successfully received by an UE is proposed so that an MBMS with further improved quality can be provided to the UE which receives MBMS data being transmitted through a common channel.

For this, the present invention proposes a method in which a BS configures an additional dedicated channel for each UE currently receiving an MBMS service through a common channel. The common channel may be a point-to-multipoint channel. The dedicated channel may be a point-to-point channel.

First, the UE receives data blocks of the MBMS through the common channel. Then, the UE examines serial numbers of the received data blocks. Upon detecting a data block which is not successfully received by the UE, the UE reports this to the BS. In this case, by using an uplink dedicated channel determined between the UE and the BS, the UE may report information on the data block which is not successfully received by the UE. Thereafter, the UE receives again the data block, which is not successfully received, from the BS through a downlink dedicated channel, and rearranges the data blocks previously received and the data blocks received through the dedicated channel.

Figure 8:
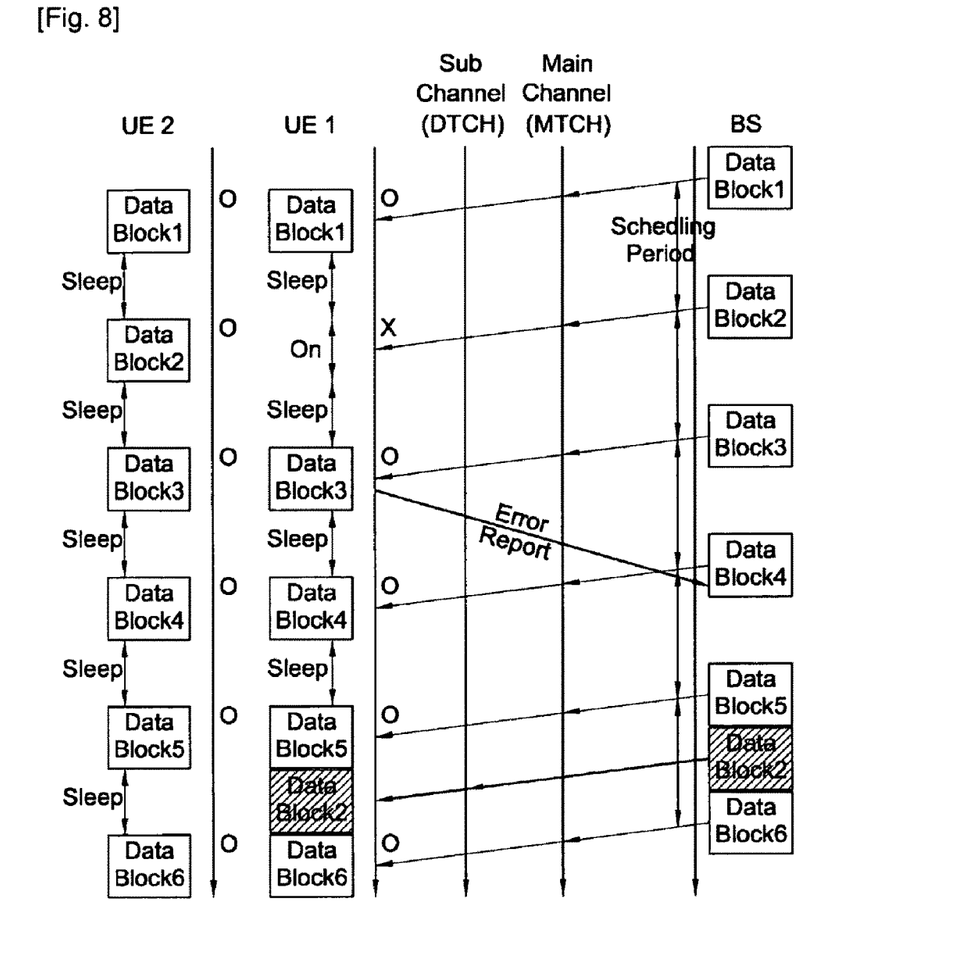
FIG. 8 shows an example of a data transmission method according to an embodiment of the present invention.

FIG. 8 shows an example of a data transmission method according to an embodiment of the present invention.

A main channel is a common channel and may be an MTCH. A sub-channel is a dedicated channel and may be a DTCH. In a call establishment process, a BS may inform that the DTCH is a channel related to an MBMS provided by an UE through the MTCH. The main channel is transmitted by using a radio resource allocated to be received by a plurality of UEs. Thus, the main channel can be received by the plurality of UEs. The sub-channel is transmitted by using a radio resource allocated to be received by only a specific UE. Thus, the sub-channel can be received by only a specially dedicated UE.

The UE configures the main channel and the sub-channel by using information delivered from the BS through the MCCH or through an RRC message. The UE receives data blocks for the MBMS through the main channel.

The UE examines serial numbers of received data blocks, and examines if there is data not received by the UE. If a data block which is not successfully received by the UE is detected, the UE collects information on this block and generates an error report. Then, the UE delivers the error report to the BS. It will be assumed herein that a data block 2 is not successfully received. The error report may be transmitted on an uplink dedicated channel such as an uplink shared channel (UL-SCH). Alternatively, the error report may be transmitted by using a signaling radio bearer (SRB). The SRB is used by the UE when a dedicated control message is transmitted to or received from the BS.

The BS determines a data block to be retransmitted through the error report. Then, the erroneous data block (e.g., the data block 2) generated during reception is transmitted on the sub-channel.

The UE restores and rearranges data by using the data blocks received through the main channel and the sub-channel.

Examination on whether the data blocks are successfully received or not can be performed in various layers. According to an embodiment, the examination on whether the data blocks are successfully received or not may be performed in a PDCP layer. The PDCP layer is connected to the main channel and the sub-channel. The data blocks are received from the respective channels and are then rearranged. Thereafter, the data blocks are delivered to an upper layer. In this case, the error report may be a PDCP status report which is generated and transmitted by a PDCP entity.

In another embodiment, the examination on whether the data blocks are successfully received or not may be performed in an RLC layer. The RLC layer is connected to the main channel and the sub-channel. The data blocks are received from the respective channels and are then rearranged. Thereafter, the data blocks are delivered to the upper layer. In this case, the error report may be an RLC status report generated and transmitted by an RLC entity.

In still another embodiment, the examination on whether the data blocks are successfully received or not may be performed in a PDCP layer or an RLC layer. The PDCP layer or the RLC layer is connected to the main channel and the sub-channel. The data blocks are received through the respective channels and are then rearranged. Thereafter, the data blocks are delivered to an upper layer. In this case, the error report is generated by the PDCP entity and is then reported to the RLC entity. Alternatively, the error report is generated by the RLC entity. The error report may be an RLC statue report transmitted by the RLC entity.

FIG. 8 shows an example of on-time active recovery when an MBMS service is ongoing. The on-time active recovery illustrated in FIG. 8 is performed in parallel to an ongoing MBMS service. Referring to FIG. 8, at first, both a UE1 and a UE2 receive a main channel (i.e., a common channel) and thus receives an MBMS while the UEs are receiving an MBMS session. The UE1 receives a data block 3 after receiving a data block 1. Thus, the UE1 knows that the data block 2 is not received, and thus reports to the BS that the data block 2 is not received by using a dedicated channel during the MBMS session. Subsequently, the BS retransmits the data block 2 through the dedicated channel during the MBMS session. UE rearranges the data blocks 1 and 3 received through the common channel and the data block 2 received through the dedicated channel, and delivers the rearranged data blocks to an upper layer.

On the other hand, although the UE2 receives the MBMS through the common channel, the UE2 does not transmit a separate error report to the BS since there is no lost data block. Moreover, the UE2 does not expect to receive data through the dedicated channel.

All functions described above may be performed by a processor such as a micro-processor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of receiving data in a wireless communication system supporting a multimedia broadcast/multicast service (MBMS) and including a base station (BS) and a mobility management entity (MME), the method performed by a mobile terminal which communicates with the BS by using a number of OFDM symbols and comprising:

receiving a first data block for the MBMS through a multicast traffic channel (MTCH) during an MBMS session from the BS, wherein a control channel for the MTCH is mapped to a downlink shared channel (DL-SCH), wherein resource allocation of the DL-SCH is included in a physical downlink control channel (PDCCH) transmitted by using a number of OFDM symbols;

determining, by a packet data convergence protocol (PDCP) layer, whether an error is detected from the first data block by using a serial number of the first data block, wherein the error is detected if the serial number of the first data block is not continuous to a highest serial number of a previously received data block;

when the error is detected, transmitting an error report through an uplink dedicated channel during the MBMS session to the BS, wherein the error report includes information associated with a third data block which is not received;

receiving, in response to the error report, the third data block which is retransmitted by the BS through a dedicated traffic channel (DTCH) which is mapped to the DL-SCH during the MBMS session;

receiving a second data block which is transmitted through the MTCH during the MBMS session, from the BS;

rearranging, by the PDCP layer, the first data block, the second data block, and the third data block; and delivering the rearranged data blocks to an upper layer of the PDCP layer, wherein the mobile terminal enters a sleep state after each MBMS session is over.

2. A mobile terminal supporting a multimedia broadcast/multicast service (MBMS) in a wireless communication system including a base station (BS) and a mobility management entity (MME), the mobile terminal which communicates with the BS by using a number of OFDM symbols configured for:

receiving a first data block for the MBMS through a multicast traffic channel (MTCH) during an MBMS session from the BS, wherein a control channel for the MTCH is mapped to a downlink shared channel (DL-SCH), wherein resource allocation of the DL-SCH is included in a physical downlink control channel (PDCCH) transmitted by using a number of OFDM symbols;

determining, by a packet data convergence protocol (PDCP) layer, whether an error is detected from the first data block by using a serial number of the first data block, wherein the error is detected if the serial number of the first data block is not continuous to a highest serial number of a previously received data block;

when the error is detected, transmitting an error report through an uplink dedicated channel during the MBMS session to the BS, wherein the error report includes information associated with a third data block which is not received;

receiving, in response to the error report, the third data block which is retransmitted by the BS through a dedicated traffic channel (DTCH) which is mapped to the DL-SCH during the MBMS session;

receiving a second data block which is transmitted through the MTCH during the MBMS session from the BS;

rearranging, by the PDCP layer, the first data block, the second data block, and the third data block; and delivering the rearranged data blocks to an upper layer of the PDCP layer, wherein the mobile terminal is configured for entering a sleep state after each MBMS session is over.

* * * * *